United States Patent
Ji et al.

(10) Patent No.: US 9,399,296 B2
(45) Date of Patent: Jul. 26, 2016

(54) FIXTURE FOR SELECTIVELY POSITIONING A WORK PIECE USING SUCTION

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Hui-Fa Ji, Jiashan (CN); Xiao-Yi Wu, Jiashan (CN); Shi-Mei Cai, Jiashan (CN); Ding-Qiang Ma, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/684,030

(22) Filed: Apr. 10, 2015

(65) Prior Publication Data
US 2016/0107320 A1    Apr. 21, 2016

(30) Foreign Application Priority Data
Oct. 20, 2014    (CN) .......................... 2014 1 0556772

(51) Int. Cl.
B25J 15/06    (2006.01)
(52) U.S. Cl.
CPC .......... B25J 15/0633 (2013.01); B25J 15/0616 (2013.01)

(58) Field of Classification Search
USPC .................. 294/183, 187, 64.2, 64.3; 901/40; 29/743; 414/752.1
See application file for complete search history.

(56) References Cited

U.S. PATENT DOCUMENTS

| | | | | |
|---|---|---|---|---|
| 3,973,682 A * | 8/1976 | Neff | ..................... | H01L 21/6838 294/186 |
| 5,308,132 A * | 5/1994 | Kirby | ..................... | B25J 9/1633 29/743 |
| 6,240,628 B1 * | 6/2001 | Yoshida | ............. | H05K 13/0408 29/740 |
| 6,328,362 B1 * | 12/2001 | Isogai | ................ | H05K 13/0408 29/740 |
| 8,540,296 B1 * | 9/2013 | Wu | ....................... | B25J 15/0616 294/183 |
| 9,138,900 B2 * | 9/2015 | Wang | ................... | B25J 15/0675 |

* cited by examiner

*Primary Examiner* — Paul T Chin
(74) *Attorney, Agent, or Firm* — ScienBiziP, P.C.

(57) ABSTRACT

A fixture includes a housing and a gas valve. The housing defines a receiving chamber and a suction hole communicating with the receiving chamber on an end. The gas valve includes a valve body and a piston. The valve body partially resists an inner surface of the receiving chamber to divide the receiving chamber. The valve body defines a first channel, and a first and second through holes respectively communicating with the first channel. The piston is movably received in the first channel, and capable of being pushed to lead the first connecting hole to communicate with the second through hole by gas flowing into the hole, and block a communication between the first connecting hole and the second through hole by gas flowing into the first channel.

13 Claims, 9 Drawing Sheets

FIXTURE FOR SELECTIVELY POSITIONING A WORK PIECE USING SUCTION

FIELD

The subject matter herein generally relates to fixtures, and in particular a fixture configured for selectively positioning a work piece using suction.

BACKGROUND

Fixtures are often used for positioning work pieces for machining.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A fixture for selectively positioning a work piece using suction can include a housing and a gas valve. The housing can have a first end, and a second end opposite the first end. A receiving chamber with an inner surface can be defined in the housing, and can extend from the first housing end into the housing toward the second housing end on the first end and extending toward the second end. The second housing end can include one or more suction holes communicating with the receiving chamber. The gas valve can have a valve body and a piston. The valve body can have a first end, a second end opposite the first end, a periphery surface connecting the valve body first end to the valve body second end, a defined first channel, a defined first through hole extending substantially parallel with the first defined channel, a second through hole spaced apart from the first through hole and the first defined channel, and a first defined connecting hole connecting the first defined channel with the peripheral surface of the valve body. The first through hole can communicate with the first defined channel and the second through hole can communicate with the first defined channel. A portion of the valve body is received within the housing receiving chamber with the first end of the housing coupled to the peripheral surface of the valve body with the first housing end. A portion of the peripheral valve body surface and a portion of the receiving chamber inner surface can cooperate to define a gas chamber. The piston can be movably received within the defined first channel. Pressurized gas flowing into the first through hole moves the piston to a first position allowing the first connecting hole to communicate with the second through hole, and the pressurized gas flowing into the first defined channel moves the piston to a second position blocking communication between the first connecting hole and the second through hole.

Figure 1:
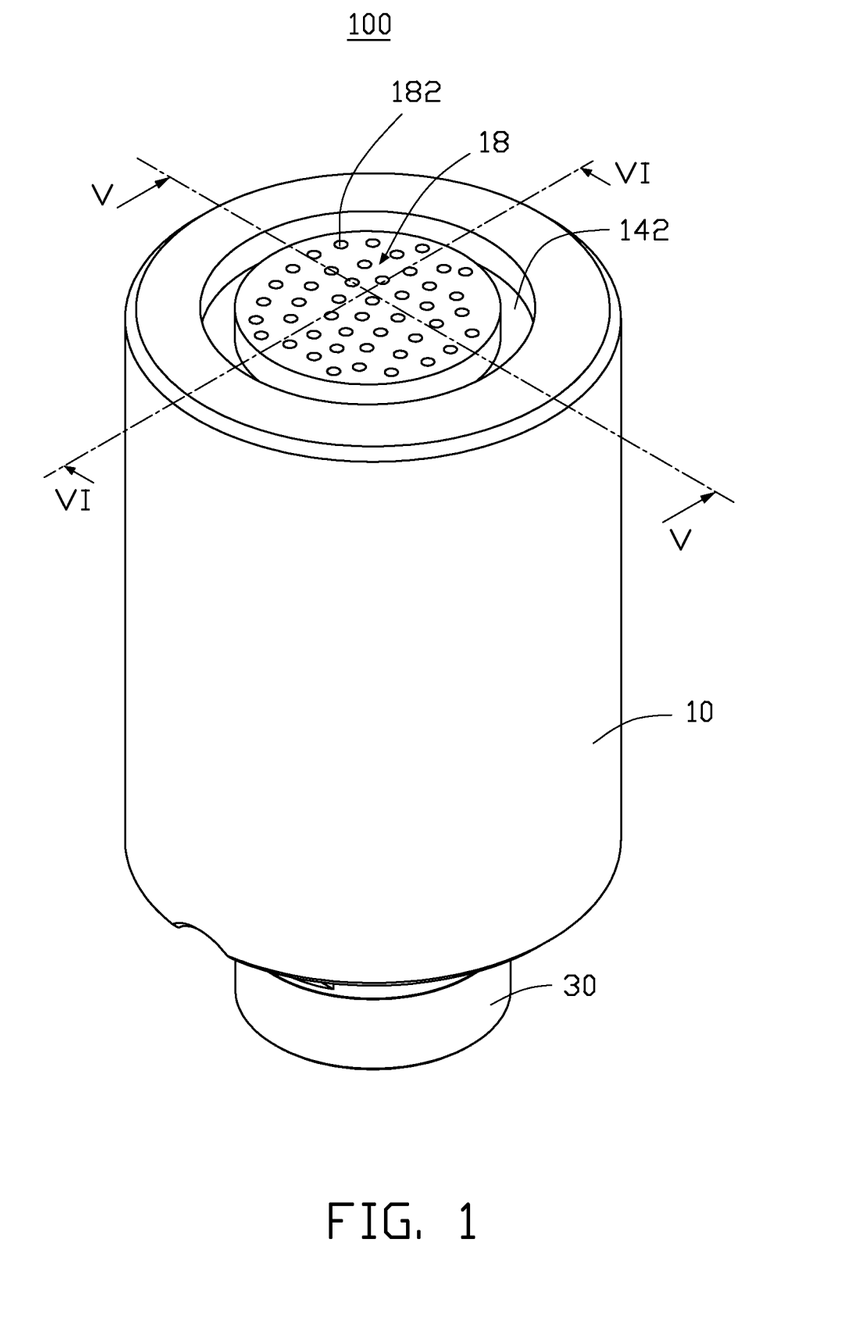
FIG. 1 is an isometric view of an embodiment of a fixture.
Figure 2:
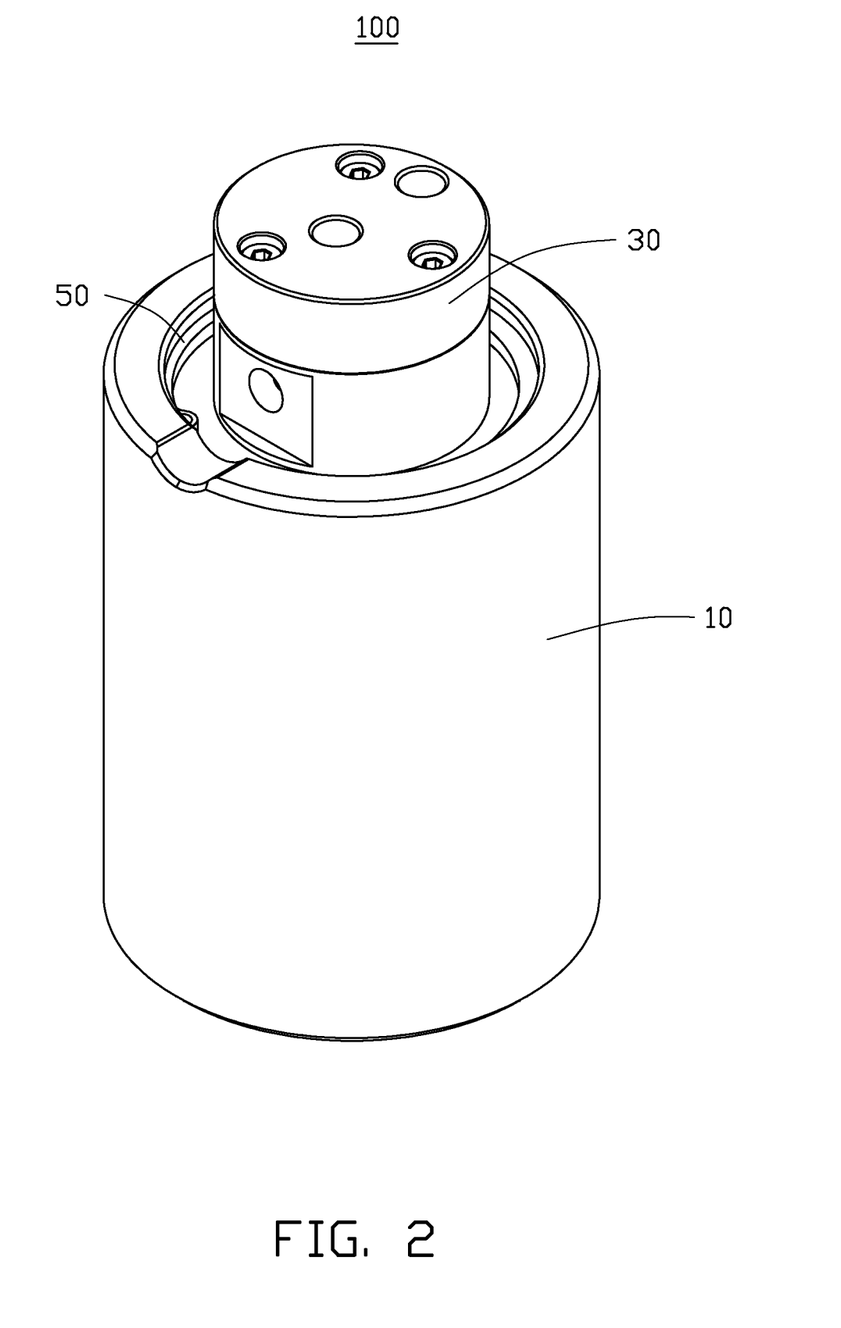
FIG. 2 is similar to FIG. 1, but viewed from another angle.
Figure 3:
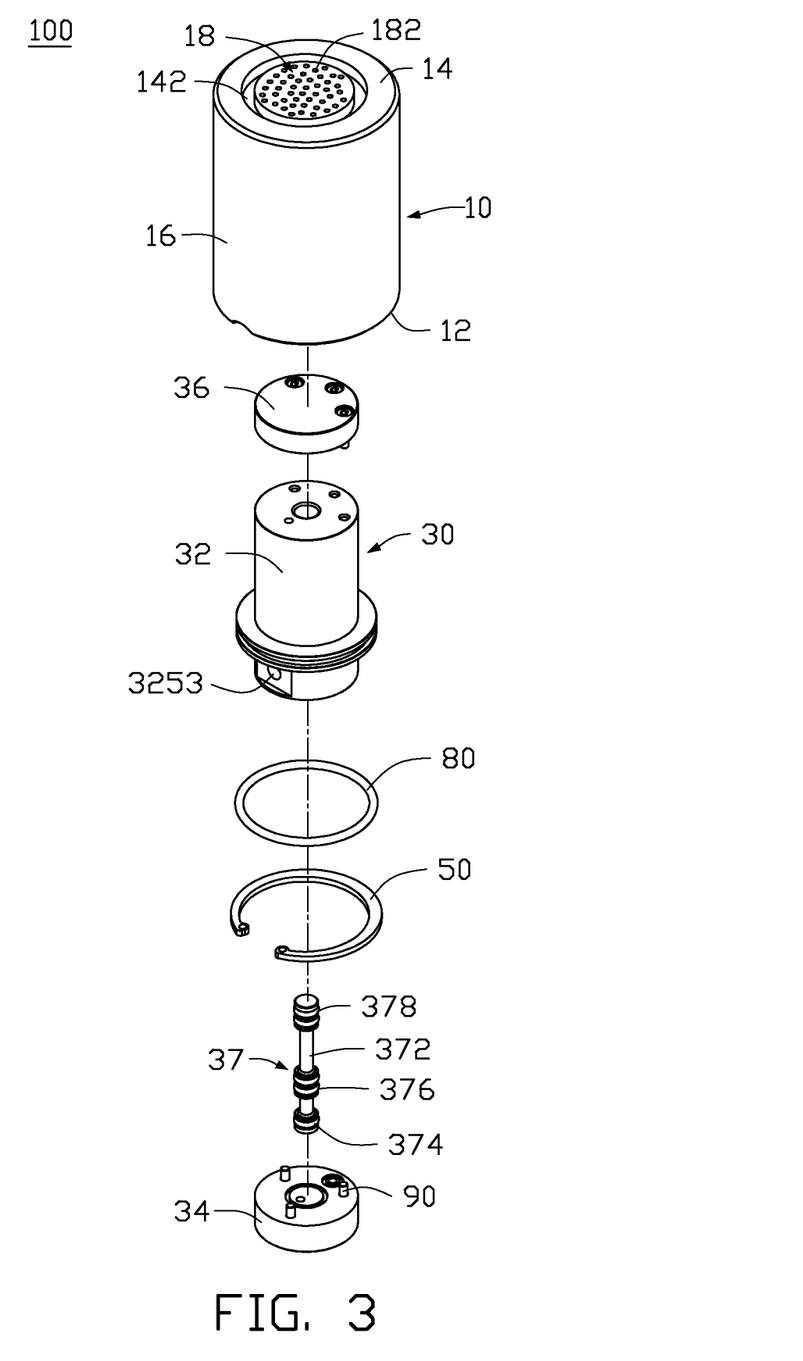
FIG. 3 is an exploded, isometric view of the fixture of FIG. 1.
Figure 4:
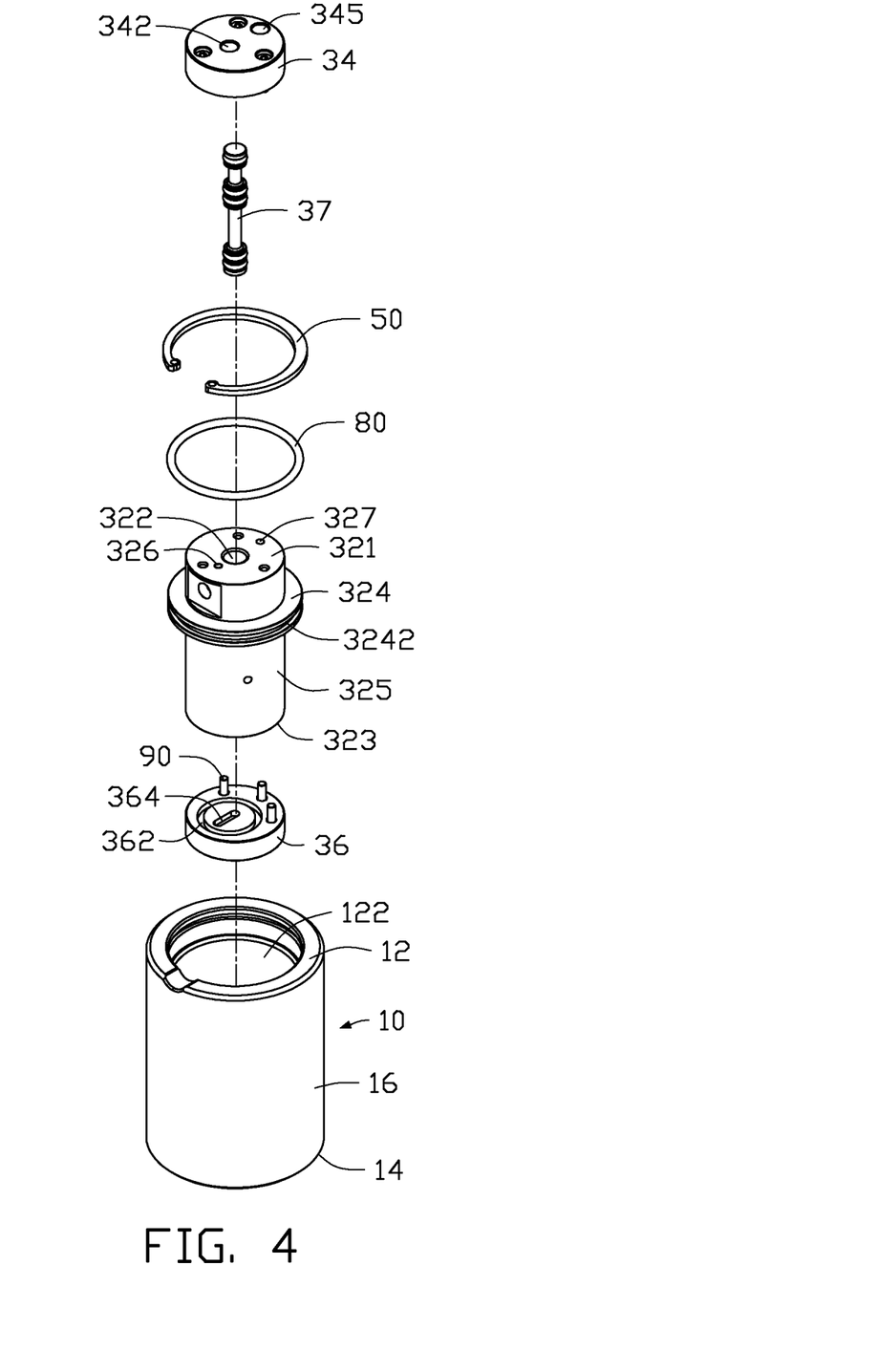
FIG. 4 is similar to FIG. 3, but viewed from another angle.
Figure 5:
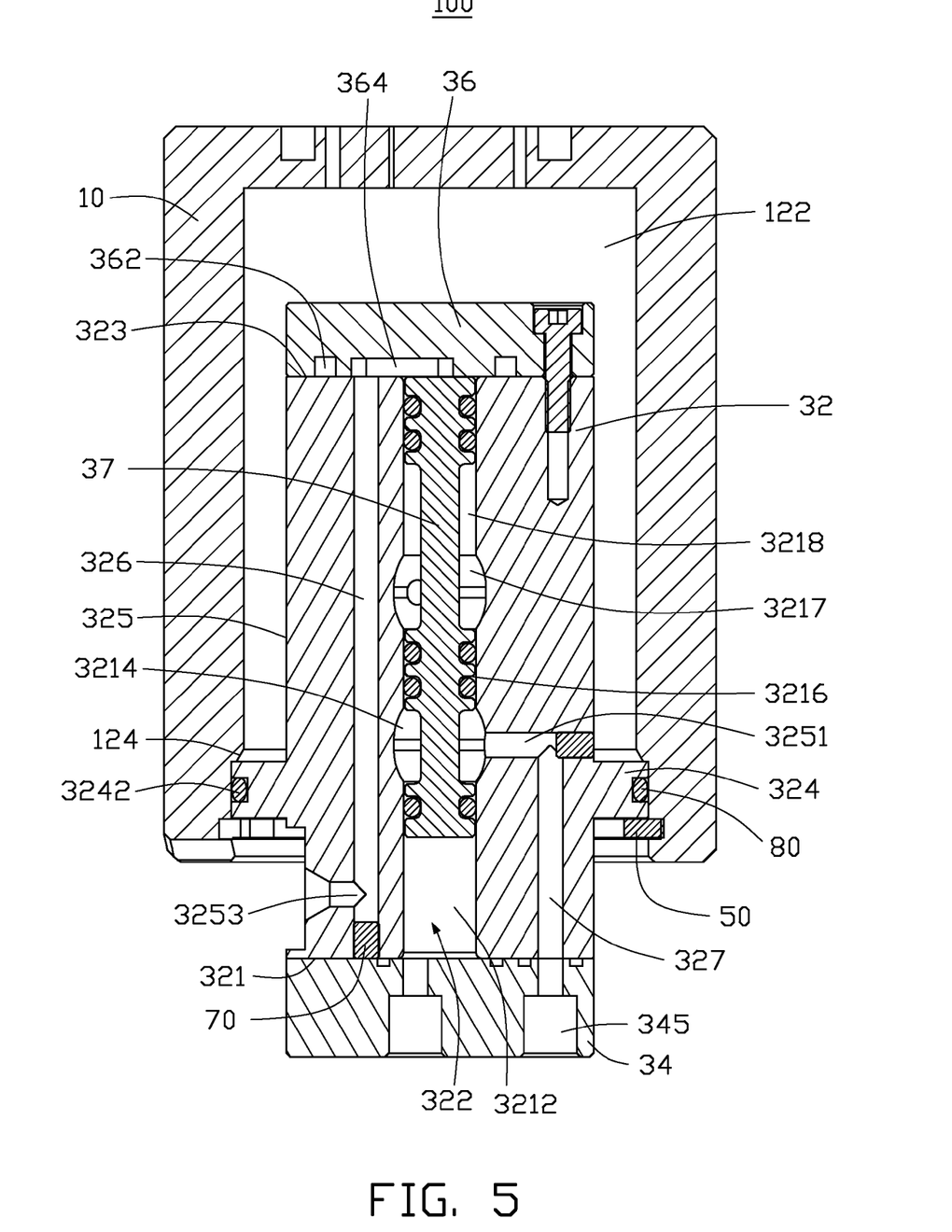
FIG. 5 is a cross-sectional view of the fixture of FIG. 1, taken along line V-V of FIG. 1.

FIGS. 1, 2 and 5 illustrate an embodiment of a fixture 100 for selectively positioning a work piece (not shown) using suction. The fixture 100 can include a housing 10, a gas valve 30 received in the housing 10, a latching member 50 mounted in the housing 10 and configured to fasten the gas valve 30 in the housing 10, a number of sealing blocks 70, and a number of sealing rings 80.

FIGS. 3 to 6 illustrate that the housing 10 can be hollow, and substantially cylindrical. The housing 10 can have a first end 12, a second end 14 opposite to the first end 12, and a sidewall 16 interconnecting the first end 12 and the second end 14. A receiving chamber 122 space with an inner surface can be defined in the housing 10 extending from the first housing end 12 into the housing 10 toward the second housing end 14. The center line of the receiving chamber 122 can substantially coincide with that of the housing 10. A latching portion 124 can protrude from an inner surface of the sidewall 16, and extend around the center line of the receiving chamber 122. A mounting groove 126 can be defined on an end of the inner surface of the sidewall 16 adjacent to the first end 12, located between the first end 12 and the latching portion 124, and can extend around the center line of the receiving chamber 122. The housing 10 can define an annular receiving groove 142 and a suction portion 18 on the second end 142. The annular receiving groove 142 can extend around the suction portion 18. In at least one embodiment, the suction portion 18 can be a part of the housing 10 which is surrounded by the annular receiving groove 142. The suction portion 18 can define a number of suction holes 182 communicating with the receiving chamber 122. In at least one embodiment, the shape of the suction portion 18 can match that of a work piece (not shown).

The gas valve 30 can include a valve body 32, a first cover 34, a second cover 36, and a piston 37. The valve body 32 can be substantially cylindrical. The valve body 32 can be partially received in the receiving chamber 122, and can partially extend out of first end 12. A diameter of the valve body 32 can be less than that of the receiving chamber 122. The valve body 32 can include a first end 321, a second end 323 opposite to the first end 321, and a peripheral surface 325 connecting the valve body first endfirst valve body end 321 and the valve body second endsecond valve body end 323. The first valve body end 321 can be located outside of the receiving chamber 122. A protrusion 324 can protrude from an end of the periphery surface 325, and extend along the periphery surface 325. The protrusion 324 can be received in the receiving chamber 122 and can resist the inner surface of the sidewall 16. A side surface of the protrusion 324 adjacent to the second valve body end 323 can resist the latching portion 124 to prevent the valve body 32 from moving toward the second end 14. The protrusion 324 can define a first sealing groove 3242 on the side surface thereof away from the peripheral surface 325. The first sealing groove 3242 can extend around the periphery of the valve body 325. In at least one embodiment, the valve body 32 can be completely received in the receiving chamber 122.

The valve body 32 can define a first channel 322, a second channel 326, a third channel 327 parallel to each other and extending from the first valve body end 321 to the second valve body end 323. The first channel 322 can substantially extend along the center line of the valve body 32, and pass through the first valve body end 321 and the second valve body end 323. The second channel 326 and the third channel 327 can be located on two sides of the first channel 322 respectively. The first channel 322 can include a first connecting portion 3212, a first channel portion 3214, a second connecting portion 3216, a second channel portion 3217, and a third connecting portion 3218 coupled to each other in that order. The first connecting portion 3212, the second connecting portion 3216, and the third connecting portion 3218 can be substantially cylindrical. The cross sections of the first channel portion 3214 and the second channel portion 3217 can be substantially oval. Widths of the first channel portion 3214 and the second channel portion 3217 can be greater than that of the first connecting portion 3212, the second connecting portion 3216, and the third connecting portion 3218.

The valve body 32 can define a first connecting hole 3255 (see FIG. 6), a second connecting hole 3253, and a third connecting hole 3251 on the peripheral surface 325. The first connecting hole 3255, the second connecting hole 3253, and the third connecting hole 3251 can extend from the peripheral surface 325 toward the center line of the valve body 32. The first connecting hole 3255 can communicate with the second channel portion 3217. The second connecting hole 3253 can communicate with the second channel 326, and can be located adjacent to the first valve body end 321. The third connecting hole 3251 can communicate with the first channel portion 3214, and can be located adjacent to the protrusion 324.

The first cover 34 can cover the first valve body end 321, and define an inlet hole 342 and an outlet hole 345. Both of the inlet hole 342 and the outlet hole 345 can pass through opposite surfaces of the first cover 34. The inlet hole 342 can communicate with the first channel 322, and the outlet hole 345 can communicate with the third channel 327. The second cover 36 can cover the second valve body end 323. A surface of the second cover 36 adjacent to the valve body 32 can define a second sealing annular groove 362 and a holding groove 364. The second sealing annular groove 362 is located around the holding groove 364. The holding groove 364 can communicate with the first channel 322 and the second channel 326. In at least one embodiment, the first cover 34 and the second cover 36 can be respectively fixed on the valve body 32 via a number of screws 90.

The piston 37 can be movably received in the first channel 322. The piston 37 can include a rod portion 372, a first sealing portion 374, a second sealing portion 376, and a third sealing portion 378. The first sealing portion 374, the second sealing portion 376, and the third sealing portion 378 can respectively protrude from the outer surface of the rod portion 372, and can be spaced apart from each other. A diameter of the rod portion 372 can be less than that of the first connecting portion 3212, the second connecting portion 3216, and the third connecting portion 3218. The first sealing portion 374 can be received in the first connecting portion 3212, and can resist the inner surface of the valve body 32 corresponding to the first connecting portion 3212 to prevent a gas leak. The second sealing portion 376 can be received in the second connecting portion 3216, and can resist the inner surface of the valve body 32 corresponding to the second connecting portion 3216 to prevent the gas leak. The third sealing portion 378 can be received in the third connecting portion 3218, and can resist the inner surface of the valve body 32 corresponding to the third connecting portion 3218 to prevent the gas leak.

The latching member 50 can be received in the mounting groove 126, and can resist the side surface of the protrusion 324 adjacent to the first valve body end 321 to prevent the valve body 32 from moving toward the first end 12. One sealing block 70 can be received in the third connecting hole 3251, located adjacent to the peripheral surface 325, and configured to seal an end of the third connecting hole 3251 away from the first channel portion 3214. One sealing ring 80 can be received in the first sealing groove 3242, can resist the inner surface of the sidewall 16, and can be configured to seal the valve body 32 and the receiving chamber 122. One sealing ring 80 can be received in the second sealing annular groove 362, and configured to seal the second cover 36 and the valve body 32.

Figure 6:
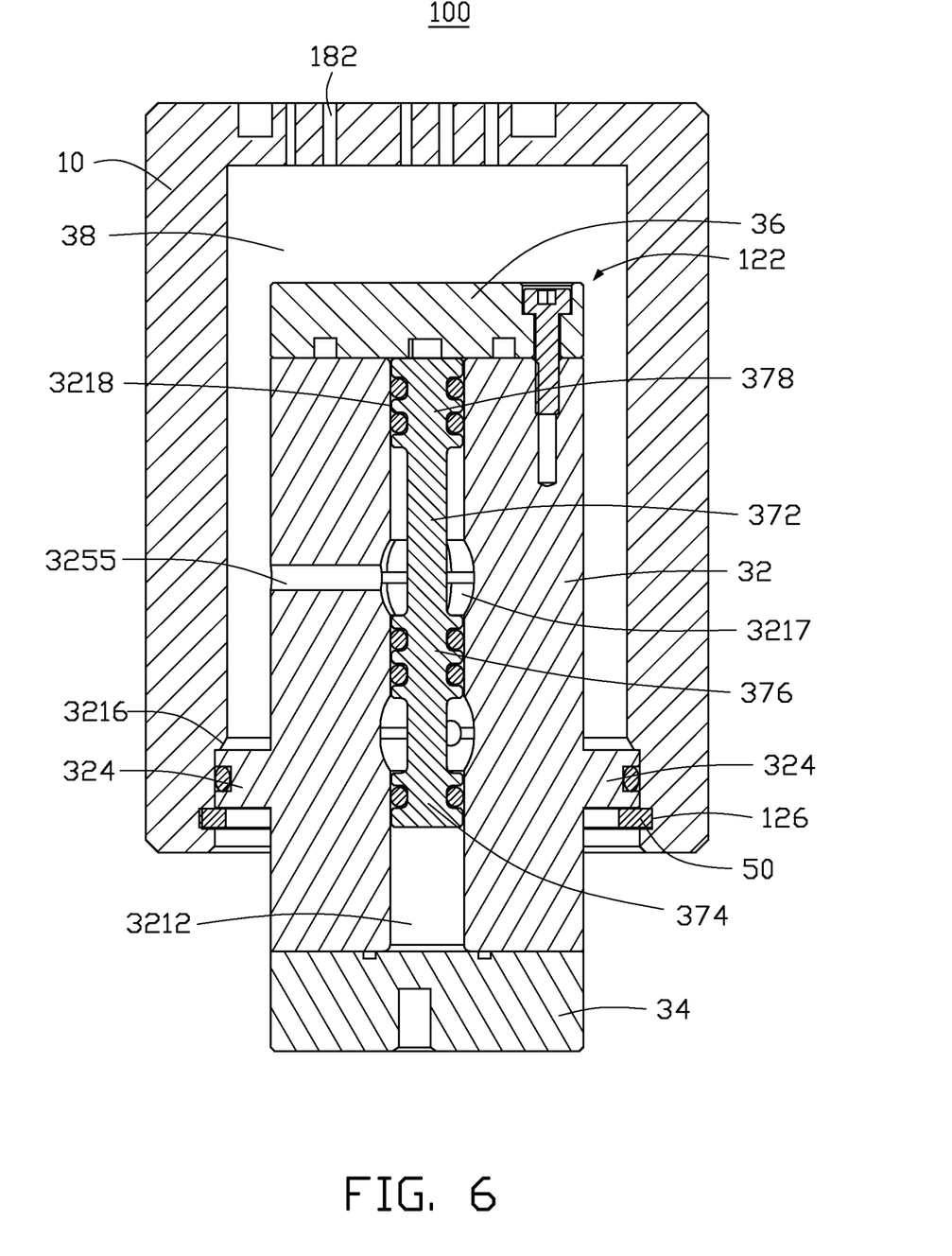
FIG. 6 is a cross-sectional view of the fixture of FIG. 1, taken along line VI-VI of FIG. 1.

When assembled, the first cover 34 can cover the first valve body end 321 of the valve body 32, the second cover 36 can cover the second valve body end 323 of the valve body 32. Both of the second cover 36 and parts of the valve body 32 can be received in the receiving chamber 122, and the side surface of the protrusion 324 adjacent to the second valve body end 323 can resist the side surface of the latching portion 124 adjacent to the first end 12. The side surface of the protrusion 324 adjacent to the second valve body end 323, a part of periphery surface 325 received in the receiving chamber 122, outer surface of the second cover 36, and a part of inner surface of the receiving chamber 122 cooperatively form a gas chamber 38 which communicates with the suction hole 182. The first connecting hole 3225 can communicate with the second channel portion 3217 and the gas chamber 38.

In at least one embodiment, a height of the first connecting portion 3212 parallel to the center line of the valve body 32 can be substantially the same as that of the third connecting portion 3218, a size of the first channel portion 3214 can be substantially the same as that of the second channel portion 3217, the size of the second sealing portion 376 can be substantially the same as that of the third sealing portion 378, and the height of the first sealing portion 374 can be less than that of the second and third sealing portions. When the piston 37 is located on an end of the first channel 322 to touch the second cover 36, the second sealing portion 376 can resist the inner surface of the valve body 32 corresponding to the second connecting portion 3216 to block a communication between the first channel portion 3214 and the second channel portion 3217, and the first sealing portion 374 can resist the inner surface of the valve body 32 corresponding to the first connecting portion 3212 to block the communication between the first channel portion 3214 and the first connecting portion 3212. When the piston 37 is located on another end of the first channel 322 to touch the first cover 34, the second sealing portion 376 can be partially received in the first connecting portion 3212 to lead the first channel portion 3214 to communicate with the second connecting portion 3216, and the third sealing portion 378 can be partially received in the third connecting portion 3218 to lead the second connecting portion 3216 to communicate with the second channel portion 3217. In this way, the third channel 327, the third connecting hole 3215, the first channel portion 3214, the second connecting portion 3216, the second channel portion 3217, and the first connecting hole 3255 can cooperatively form a gas channel (not shown). In at least one embodiment, the sizes of the first sealing portion 374, the second sealing portion 376, and the third sealing portion 378 are not limited to above, so long as, when the piston 37 is located on an end of the first channel 322 adjacent to the first cover 34, the gas received in the gas chamber 38 can flow out through the first connecting hole 3255, the first channel 322 and the third channel 327; when the piston is located on the end of the first channel 322 adjacent to the second cover 36, the gas received in the first channel 322 can be blocked from flowing into the gas chamber 38.

Figure 7:
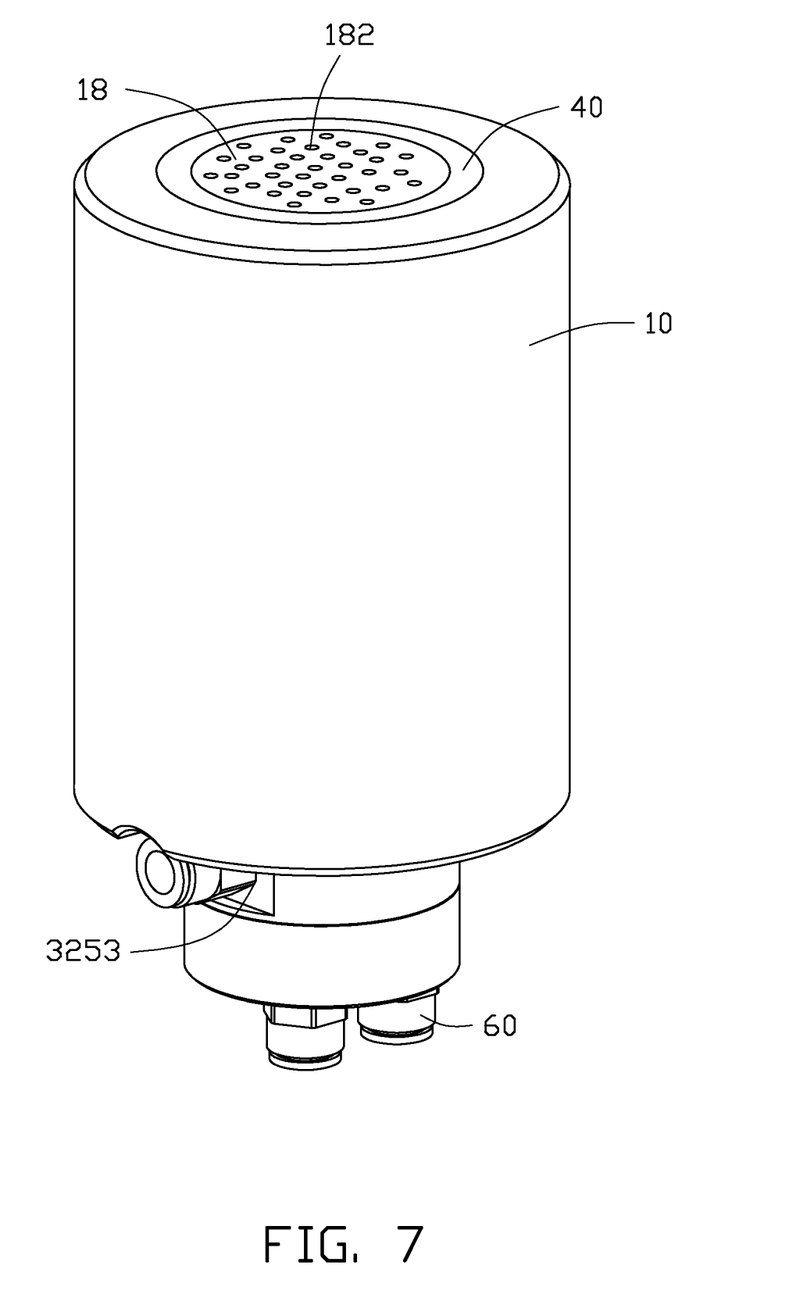
FIG. 7 is similar to FIG. 1, but showing the fixture in a state of use.
Figure 8:
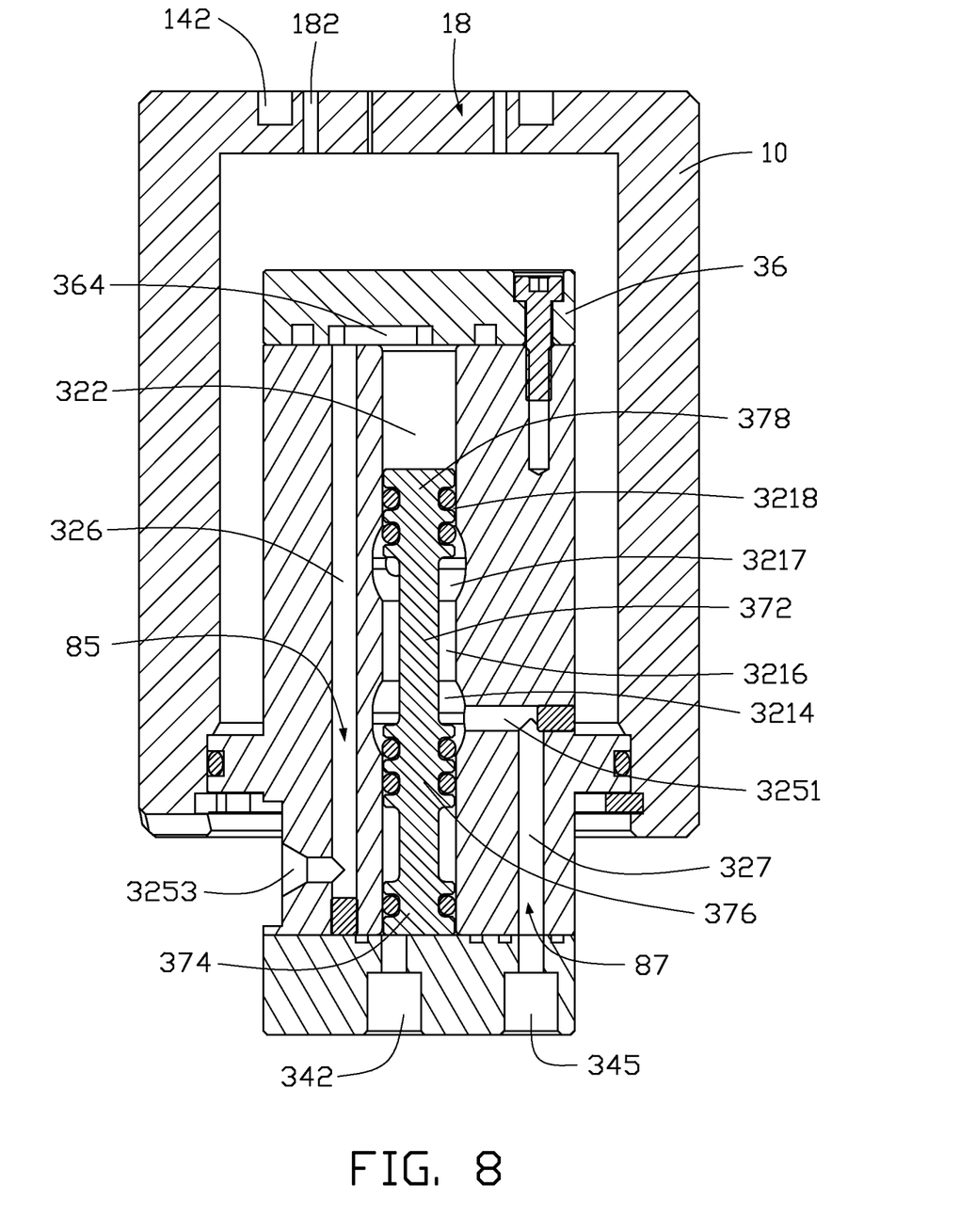
FIG. 8 is similar to FIG. 5, but showing the fixture in a state of use.
Figure 9:
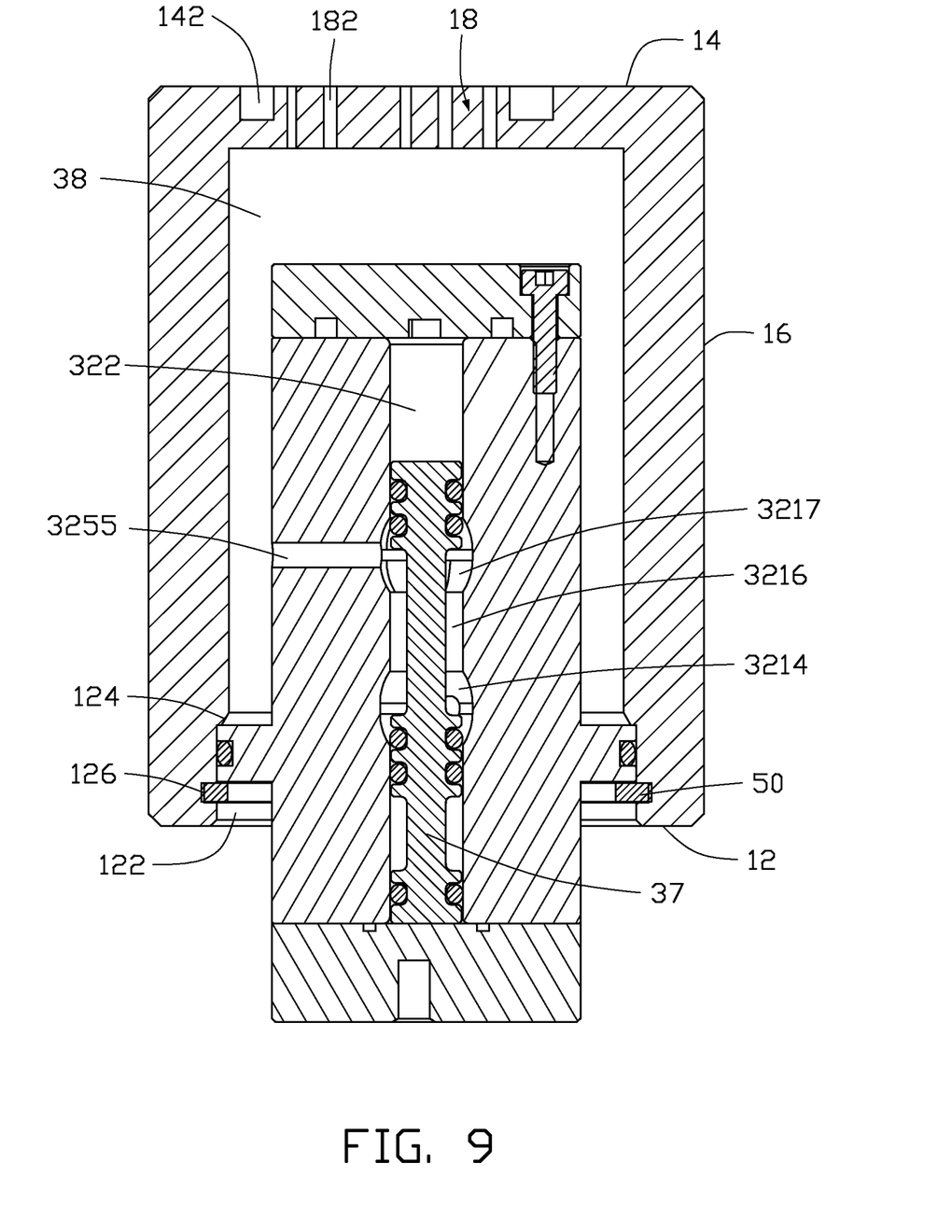
FIG. 9 is similar to FIG. 6, but showing the fixture in a state of use.

FIGS. 7 to 9 illustrate when in use, a number of pipe connectors 60 can be respectively inserted into the second connecting hole 3253, the inlet hole 342, and the outlet hole 345, can be respectively coupled to a gas generator device (not shown). A work piece (not shown) can be positioned on the suction portion 18, and a work piece sealing ring 40 can be received in the receiving groove 142 to seal the work piece and the housing 10. Gas can flow into the first channel 322 via the second connecting hole 3253, the second channel 326 and the holding groove 364, to push the piston 37 to move toward the first cover 34. When the first sealing portion 374 touches the first cover 34, the piston 37 stops moving. Meanwhile, the inlet hole 34 communicates with the gas chamber 38 via the third channel 327, the third connecting hole 3251, the first channel portion 3214, the second connecting portion 3216, the second channel portion 3217 and the first connecting hole 3255 in that order. Gas received in the gas chamber 38 can be suctioned out by a vacuum pump (not shown) via the outlet hole 345, thus the gas chamber 38 can be a vacuum, and the work piece can be suctioned to the suction portion 18. When a negative pressure of the gas chamber 38 reaches a predetermined pressure, gas can flow into the first channel 322 via the inlet hole 342 to move the piston 37 toward the second cover 36. When the third sealing portion 378 of the piston 37 touches the second cover 36, the gas can be stopped from flowing into the first channel 322, at this time, the second sealing portion 378 can resist the inner surface of the valve body 32 corresponding to the second connecting portion 3216 to block the communication between the first channel portion 3214 and the second channel portion 3217. In this way, the gas pressure of the gas received in the gas chamber 38 can be maintained, and the work piece can be firmly suctioned to the suction portion 18. During testing, the gas pressure of the gas received in the gas chamber 38 stays below 0.02 kPa within 24 hours.

In at least one embodiment, the first and second covers can be omitted, so long as the first channel 322 can communicate with the second channel 326. In at least one embodiment, the sealing blocks 70 can be omitted, at this time, the second connecting hole 3253 and the second channel 326 can be made as one Z-shaped first through hole 85 (shown in FIG. 8), the second connecting hole 3251 and the third channel 327 can be made as one L-shaped second through hole 87 (shown in FIG. 8). A first end of the first through hole 85 can pass through the peripheral surface 325, and a second end of the first through hole 85 can communicate with the first channel 322. The first end of the second through hole 87 can pass through the first valve body end 321, and the second end of the second through hole 87 can communicate with the first channel 322. In at least one embodiment, the first end of the first through hole 85 does not pass through the peripheral surface 325, and the first end of the second through hole 87 does not extend through the first valve body end 321, so long as the first through hole 85 and the second through hole 87 are spaced apart from each other, communication with the first channel 322 can be achieved, and exposed out of the receiving chamber 122. In at least one embodiment, all of the latching member 50, the latching portion 124, and the sealing rings 80 can be omitted, so long as the protrusion 324 resists an inner surface of the sidewall 16 to form the gas chamber 38 in the housing 10. In at least one embodiment, the receiving groove 142 can be omitted.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A fixture for selectively positioning a work piece using suction, the fixture comprising:
　a housing having:
　　a first end; and
　　a second end opposite the first end;
　　wherein, a receiving chamber with an inner surface is defined in the housing extending from the first housing end into the housing toward the second housing end; and
　　wherein, the second housing end includes one or more suction holes communicating with the receiving chamber; and
　a gas valve having:
　　a valve body with a first end, a second end opposite the first end and a peripheral surface connecting the valve body first end to the valve body second end, the valve body having a defined first channel, a defined first through hole extending substantially parallel with the first defined channel, a second through hole spaced apart from the first through hole and the first defined channel, and a first defined connecting hole connecting the first defined channel with the peripheral surface of the valve body;
　　wherein, the first through hole communicates with the first defined channel and the second through hole communicates with the first defined channel; and
　　wherein, a portion of the valve body is received within the housing receiving chamber with the first end of the housing coupled to the peripheral surface of the valve body with the first housing end, a portion of the peripheral valve body surface and a portion of the receiving chamber inner surface cooperating to define a gas chamber; and a piston movably received within the defined first channel;

wherein, pressurized gas flowing into the first through hole moves the piston to a first position allowing the first connecting hole to communicate with the second through hole, and the pressurized gas flowing into the first defined channel moves the piston to a second position blocking communication between the first connecting hole and the second through hole.

2. The fixture of claim 1, wherein a protrusion protrudes from the periphery surface of the valve body and extending along the periphery surface to resist the inner surface of the receiving chamber; a portion of the periphery surface of the protrusion, the portion of the periphery valve body surface received in the housing, and the portion of the receiving chamber inner surface cooperatively define the gas chamber.

3. The fixture of claim 2, further comprising a latching member fixed on an end of the inner surface of the receiving chamber adjacent to the first end, a latching portion protruding from the end of the inner surface of the receiving chamber and spaced away from the latching member, wherein the protrusion resists between the latching member and the latching portion to fix the valve body.

4. The fixture of claim 2, wherein the protrusion defines a first sealing groove on the side surface thereof, the fixture further comprises a sealing ring sleeved in the first sealing groove of the protrusion and resisting the inner surface of the receiving chamber.

5. The fixture of claim 1, wherein the gas valve further comprises a first cover covering an end of the valve body adjacent to the first end, defines an inlet hole communicating with the defined first channel, and an outlet hole communicating with the second through hole, the first through hole passes through the periphery wall of the valve body and the end of the valve body adjacent to the first cover, and is covered by the first cover.

6. The fixture of claim 1, wherein the defined first channel and the first through hole respectively pass through an end of the valve body adjacent to the second end, the gas valve further comprises a second cover covering the end of the valve body adjacent to the suction hole, thus that the gas valve covers the defined first channel and the first through hole, the second cover defines a holding groove communicating with the defined first channel and the first through hole.

7. The fixture of claim 6, wherein the first through hole comprises a second channel passing through opposite ends of the valve body, and a second connecting hole passing through the periphery surface of the valve body and communicating with the second channel.

8. The fixture of claim 1, wherein the second through hole comprises a third channel passing through the end of valve body adjacent to the first end, and a third connecting hole defined on the periphery surface of the valve body and communicating with the third channel and the defined first channel.

9. The fixture of claim 8, wherein the fixture further comprises a sealing block received in the end of the third connecting hole away from the defined first channel.

10. The fixture of claim 1, wherein the defined first channel comprises a first connecting portion, a first channel portion communicating with the second through hole, a second connecting portion, a second channel portion communicating with the first connecting hole, and a third connecting portion coupled to each other in that order, the piston resists inner surface of the valve body corresponding to the first, second, and third connecting portions, widths of the first and second channel portions are greater than that of the first, second, and third connecting portions.

11. The fixture of claim 10, wherein the piston comprises a rod portion, and a first sealing portion, a second sealing portion, and a third sealing portion respectively protruding from the periphery wall of the rod portion and spaced away from each other, the first sealing portion resists the inner surface of the valve body corresponding to the first connecting portion, the second sealing portion resists the inner surface of the valve body corresponding to the second connecting portion, the third sealing portion resists the inner surface of the valve body corresponding to the third connecting portion.

12. The fixture of claim 1, wherein the housing defines a suction portion and an annular receiving groove extending around the suction portion on the second end, the suction hole is defined on the suction portion.

13. The fixture of claim 12, wherein the fixture further comprises a work piece sealing ring received in the annular receiving groove.

* * * * *